June 28, 1932. W. PEYINGHAUS 1,865,335
TWO-PART AXLE BEARING BLOCK OR CASING FOR RAILWAY VEHICLES
Filed June 22, 1929 2 Sheets-Sheet 1

Inventor
Walter Peyinghaus
By Cushman, Bryant & Darley
attys

June 28, 1932. W. PEYINGHAUS 1,865,335
TWO-PART AXLE BEARING BLOCK OR CASING FOR RAILWAY VEHICLES
Filed June 22, 1929 2 Sheets-Sheet 2
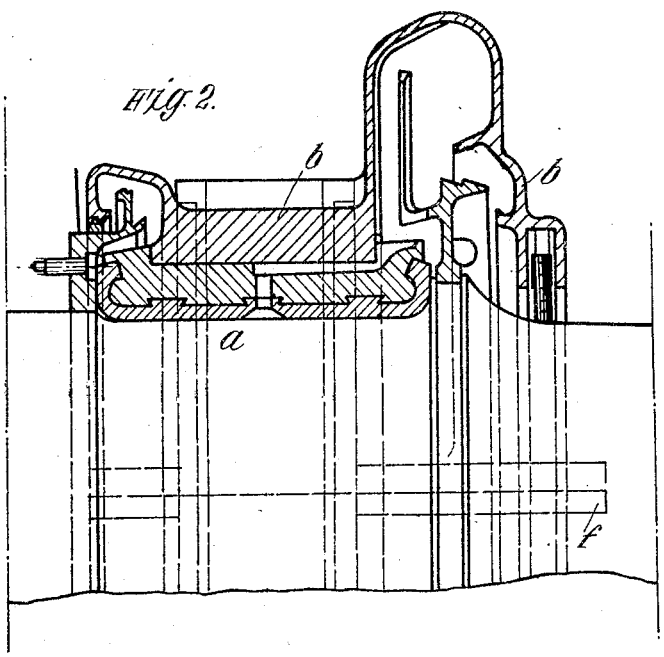
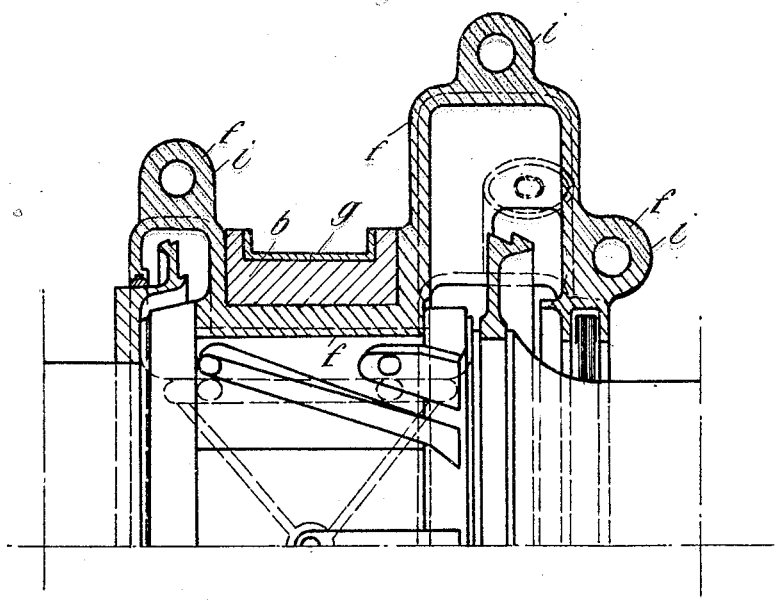

Patented June 28, 1932

1,865,335

UNITED STATES PATENT OFFICE

WALTER PEYINGHAUS, OF BEZIRK HAGEN, GERMANY

TWO-PART AXLE BEARING BLOCK OR CASING FOR RAILWAY VEHICLES

Application filed June 22, 1929, Serial No. 372,975, and in Germany June 19, 1928.

This invention relates to two-part axle bearing blocks or casings for railway vehicles, and in particular, to the inner bearings of locomotives.

The known constructional form of vehicle axle bearing provided with means for lubricating the bearing from the top and a centrifugal lubricator or oil picking-up disc or blade has hitherto been reserved exclusively for railway and tramway vehicles provided with outer bearings the fitting of which permitted a closed construction of the axle bearing and the load on which occurred principally from the top, that is to say, directly on the upper casing part and bearing brass.

In the case of locomotives with inner bearings and with spring suspensions which are generally arranged underneath and which cause the load to be transferred from the lower spring leaf to the upper bearing brass, it is particularly desirable, in axle bearings with lubrication from above, for the axle bearing casing to be divided along a horizontal line passing through the centre of the axle so that erection will be facilitated and, on account of the oil circulation and with a view to preventing heavy oil losses, to provide a thoroughly oil-tight seal between the two parts of the casing. Also, in view of the limited space and weight conditions on a locomotive, it is important that the load should be transmitted from the lower spring suspension to the upper bearing brass by some simple means which will not increase to any appreciable extent the weight of the locomotive, especially as, in any case, a construction with lubrication from above is always heavier than the ordinary construction with wick and pad lubrication.

According to the present invention the difficulties referred to above are overcome by extending the upper part of the casing downwardly in the form of a fork so that the load may be taken directly from the upper casing part on to the ends of the fork without interfering with or breaking the seal between the two parts of the casing.

In order that the said invention may be clearly understood and readily carried into effect, the same will now be more fully described with reference to the accompanying drawings, in which:—

Figure 2 is a longitudinal vertical section of the axle bearing shown in Figure 1; and Figure 3 is a horizontal section taken on a plane passing through the centre of the axle, the upper bearing brass being left in position.

Figure 1:
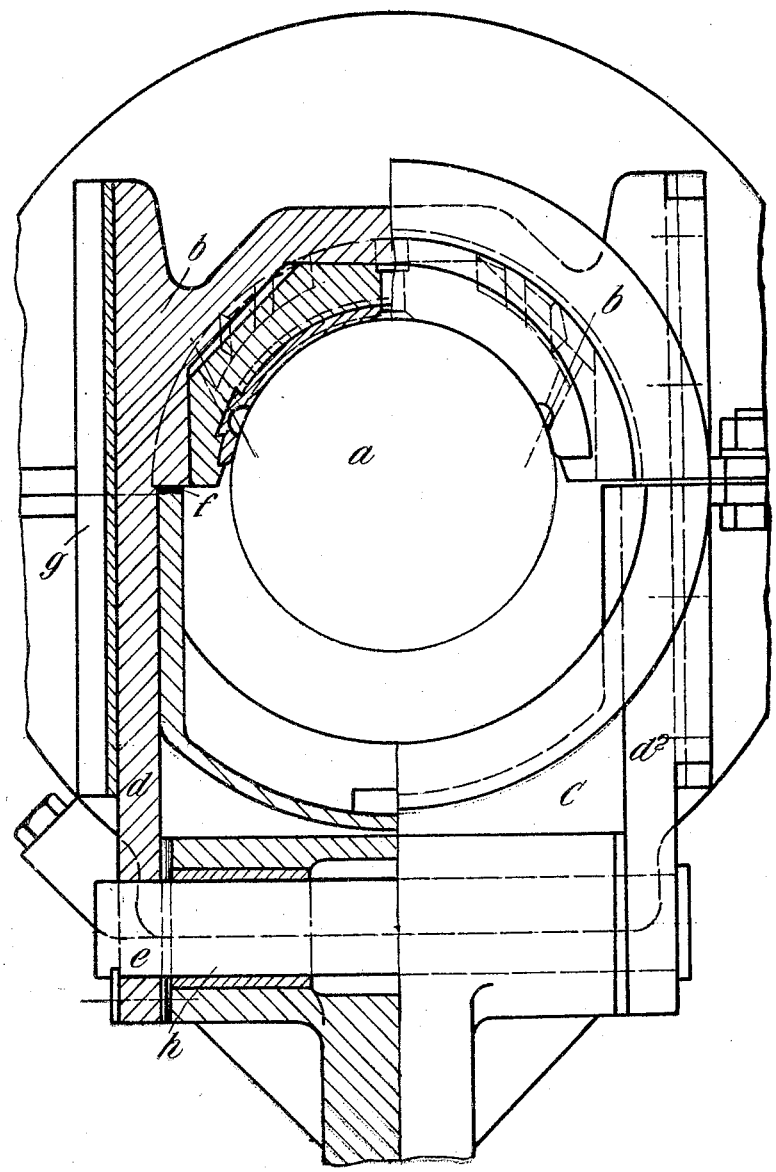
Figure 1 is a view half in elevation and half in section through the centre of an axle bearing embodying the invention, the said view being taken looking from the wheel towards the centre of the locomotive.

$a$ is the axle journal and $b$ the upper part of the axle bearing casing provided with lubricating channel $k$. $c$ is the lower part of the axle casing and $d^1$ and $d^2$ are the two downwardly extending parts of the upper casing part, the said parts being disposed one on each side of the axle. $e$ are holes formed in the ends of the forked parts $d^1$ and $d^2$ for the reception of the bolt $h$ of the spring suspension. $f$ is a sealing member which is disposed between the two parts of the casing and the extent of which can be seen from the cross hatching shown in Figure 3. $g$ are guide jaws which are formed on the sides of the axle bearing casing so as to permit the latter to slide in the frame of the locomotive. $i$ are flange connections by which the lower casing part is secured to the upper casing part.

The downwardly extending parts $d^1$ and $d^2$ of the upper casing part $b$ enable the load placed on the spring suspension to be transmitted directly to the upper part of the bearing casing and thus on to the bearing brass in such a manner that the lower part $c$ and the flange connections which effect an oil-tight sealing between the two parts of the casing are not affected by the load transmission. Moreover, the sealing member $f$ which is disposed between the two parts of the casing is not interrupted or broken.

What I claim and desire to secure by Letters Patent of the United States:—

In a two-part cylindrical axle bearing casing for railway vehicles of the kind comprising an upper part and a lower part rigidly bolted together in an oil-tight manner by vertically extending bolts, a sealing member between the upper and lower parts at each side of the axle, downwardly extending legs integral with the upper part and embracing the lower part and extending below the same and provided with aligned openings, a spring suspension having a sleeve located immediately below the said lower part and fitted between the lower ends of the legs and extending across the space between the same, and a pivot bolt passing through the aligned openings in the sleeve and securing the spring suspension to the legs, whereby the lower part is confined between the spring suspension and the said upper part of the axle bearing casing.

WALTER PEYINGHAUS.